United States Patent

Nakamura et al.

[11] Patent Number: 5,854,320
[45] Date of Patent: Dec. 29, 1998

[54] WATER BASE ERASABLE INK COMPOSITIONS

[75] Inventors: Keiko Nakamura; Norihiro Hirano; Kenichi Shibuya, all of Osaka, Japan

[73] Assignee: Sakura Color Products Corporation, Osaka, Japan

[21] Appl. No.: 691,914

[22] Filed: Aug. 1, 1996

[30] Foreign Application Priority Data

Aug. 3, 1995 [JP] Japan .................................. 7-198726

[51] Int. Cl.⁶ .............................. C09D 11/16; C08L 5/16
[52] U.S. Cl. .......................... 524/48; 523/160; 536/103; 106/210
[58] Field of Search .................................. 523/160, 161; 524/48; 536/103; 106/210

[56] References Cited

U.S. PATENT DOCUMENTS 5,004,763  4/1991  Imagawa .................................. 523/161
5,412,021  5/1995  Nakanishi .............................. 523/160
5,561,175  10/1996 Imagawa ................................ 523/161

*Primary Examiner*—Peter A. Szekely
*Attorney, Agent, or Firm*—Merchant, Gould, Smith, Edell, Welter & Schmidt

[57] ABSTRACT

A water base erasable ink composition for use in marking pens which comprises:

(a) water as a solvent;
(b) a coloring agent;
(c) an aqueous emulsion of at least one nonvolatile oily material which is liquid at room temperatures and is selected from the group consisting of aliphatic carboxylic acid esters, higher hydrocarbons and higher alcohols in a dry amount of 1–50% by weight;
(d) a cyclodextrin or its derivative in an amount of 0.1–20% by weight; and
(e) a resin which is film-forming at room temperatures.

The ink composition has improved storability over a long period of time.

9 Claims, No Drawings

WATER BASE ERASABLE INK COMPOSITIONS

BACKGROUND OF THE INVENTION

1. Field of the Invention

This invention relates to a water base erasable ink composition for use in marking pens that forms readily erasable writings on impervious writing surfaces after long standing, and a process for production of the same.

2. Description of the Prior Art

There are already known a variety of ink compositions for use in marking pens that form on impervious writing surfaces, usually called white boards such as of enamel, resin or metal, writings that are erasable by wiping lightly with erasers made of felt, for example. These erasable ink compositions usually contain an additive called a separating agent so that the ink composition is erasable, together with water as a solvent, a colorant and a film- forming resin. The separating agent is usually an oily material which is liquid and nonvolatile at room temperatures, such as aliphatic carboxylic acid esters, and it is incorporated in the ink composition in the form of emulsion, as disclosed in Japanese Patent Application Laid-open No. 1-252681.

As mentioned above, the known water base erasable ink composition contains the separating agent in the form of O/W (oil-in-water) type emulsion, that is, finely divided oily particles dispersed in water. Accordingly, the particles of the emulsion are not always stable in water, but they have a tendency to aggregate together and separate from the aqueous phase after long periods of standing. This means that the known water base erasable ink compositions are poor in storability over a long period of time. When the separating agent has aggregated and separated from the aqueous phase, the ink composition does not write well and also forms no erasable writings.

SUMMARY OF THE INVENTION

Therefore, it is an object of the invention to solve the above mentioned problems involved in the known water base erasable ink compositions, and to provide a water base erasable ink composition that contains a separating agent in the form of emulsion and is improved in the stability of the separating agent after standing over a long period of time.

The invention provides a water base erasable ink composition for use in marking pens which comprises:

(a) water as a solvent;
(b) a coloring agent;
(c) an aqueous emulsion of at least one nonvolatile oily material which is liquid at room temperatures and is selected from the group consisting of aliphatic carboxylic acid esters, higher hydrocarbons and higher alcohols in a dry amount of 1–50% by weight;
(d) a cyclodextrin or its derivative in an amount of 0.1–20% by weight; and
(e) a resin.

A preferred embodiment of the water base erasable ink composition of the invention comprises:

(a) water as a solvent;
(b) a water insoluble pigment;
(c) an aqueous emulsion of at least one nonvolatile oily material which is liquid at room temperatures and is selected from the group consisting of aliphatic carboxylic acid esters, higher hydrocarbons and higher alcohols in a dry amount of 1–50% by weight;
(d) a cyclodextrin or its derivative in an amount of 0.1–20% by weight;
(e) a water soluble resin; and
(f) a surfactant.

The invention further provides a process for the preparation of a water base erasable ink composition which comprises:

(a) water as a solvent;
(b) a water insoluble pigment;
(c) an aqueous emulsion of at least one nonvolatile oily material which is liquid at room temperatures and is selected from the group consisting of aliphatic carboxylic acid esters, higher hydrocarbons and higher alcohols in a dry amount of 1–50% by weight;
(d) a cyclodextrin or its derivative in an amount of 0.1–20% by weight;
(e) a water soluble resin; and
(f) a surfactant;

the process comprising: adding the surfactant and the colorant to water, and then adding a cyclodextrin or its derivative to water to form a mixture, and then adding the emulsion of the oily material to the mixture; and then finally adding the water soluble resin to the mixture.

DETAILED DESCRIPTION OF THE INVENTION

The ink composition of the invention is suitable for use in a writing instrument called a marking pen or a felt pen, which has within a hollow holder an ink reservoir composed of felt or a bundle of fibers impregnated with ink. A pen tip is composed of a resin mold and is fitted at the end of the holder, to which the ink is supplied from the ink reservoir by making use of capillary phenomenon, thereby permitting writing. However, the ink composition of the invention is also suitable for use in a marking pen which stores ink within a hollow holder itself.

The ink composition of the invention uses water as a solvent (the balance) in the ink composition. It contains water usually in an amount of 50–90% by weight, preferably in an amount of 60–80% by weight.

The ink composition of the invention contains a colorant, preferably a water insoluble pigment. The pigment includes, for example, carbon black, phthalocyanines such as copper phthalocyanine blue, threne pigments, azo pigments, quinacridones, anthraquinones, dioxazines, indigos, thioindigos, perynones, perylenes, indolenones and azoazomethines. Fluorescent pigments may also be used.

A variety of aqueous pigment dispersions are commercially available, and they may be preferably used in the invention. The dispersion usually contains a dispersant or a surfactant, so that the ink composition of the invention may contain such a dispersant or a surfactant when the dispersion is used in the ink composition. The dispersant is usually a polymer or resin. The dispersant is contained in the dispersion usually in a solid amount of 0.05–20 parts by weight, preferably in an amount of 0.1–5 parts by weight, per one part by weight of pigments.

The ink composition of the invention may contain a plastic pigment which is composed of resin particles as a white colorant. The plastic pigment is an aqueous emulsion of hollow resin particles of, for example, polystyrene, acrylic-styrene copolymer, polymethyl methacrylate or polyvinyl chloride prepared by emulsion (co) polymerization. The resin particles have a diameter usually of 0.3–1.0 $\mu$m. The plastic pigment colored with pigments or dyes may also be used as a chromatic colorant.

The colorant is contained in the ink composition usually in an amount of 0.1–30% by weight, preferably in an amount of 1–20% by weight, based on the ink composition. When the content of colorant is too large, the resultant ink composition has an excessively high viscosity so that it is not erased readily and also writes poorly. On the other hand, when the content of colorant is too small, the resultant ink composition fails to form writings of appropriate darkness.

The ink composition of the invention contains a separating agent, which is a nonvolatile and oily liquid material at room temperatures in the form of an aqueous emulsion. Any material that is used as a separating agent in the form of aqueous emulsion in the known water base erasable ink compositions may be used as a separating agent in the ink composition of the invention.

However, an oily material which is nonvolatile and liquid at room temperatures and is selected from the group consisting of aliphatic carboxylic acid esters, higher hydrocarbons and higher alcohols may be used as a preferred separating agent in the invention.

The aliphatic carboxylic acid ester includes monobasic carboxylic acid esters, dibasic carboxylic acid diesters, mono- or diesters of dihydric alcohols, and mono-, di- or triesters of trihydric alcohols. Preferred examples are monobasic carboxylic acid esters, especially higher fatty acid esters such as propyl myristate, butyl palmitate or butyl stearate; aliphatic dibasic acid diesters such as dodecanedioic acid dioctyl ester, dipropyl adipate, dioctyl sebacate or dioctyl azelate; dihydric alcohol esters such as propyleneglycol monostearate or propyleneglycol didecanoate; and trihydric alcohol esters such as natural or synthetic fatty acid triglycerides, or trimethylolpropane triesters such as triisostearate.

The higher hydrocarbon used as a separating agent is not specifically limited, but may be exemplified by liquid paraffin and squalane. Oxidized polyethylene wax may also be used. The higher alcohol used is also not specifically limited, but may be exemplified by hexyl alcohol, octyl alcohol and lauryl alcohol.

Aqueous emulsions of the aliphatic acrboxylic acid esters, higher hydrocarbons or higher alcohols may be prepared by conventional emulsifying methods, and are commercially available. The emulsion may be used singly or as a mixture of two or more.

The material which is nonvolatile and oily at room temperatures as above mentioned is contained, as the separating agent, in a dry amount of 1–50% by weight, preferably in an amount of 2–20% by weight, based on the ink composition. When the amount of the separating agent is less than 1% by weight, the resultant ink composition is not readily erasable, whereas when the amount of the separating agent is more than 50% by weight, the resultant ink composition writes poorly or it stains a writing surface.

The ink composition of the invention contains a cyclodextrin or its derivative as a stabilizer of the separating agent contained in the form of an aqueous emulsion in the ink composition. The cyclodextrin is a cyclic sugar oligomer composed of six to ten D-Glucopyranoside groups bonded together through $\alpha$-(1,4) glucosidic linkage. Among the cyclodextrins, are well known $\alpha$-, $\beta$- or $\gamma$- cyclodextrin which has a polymerization degree of 6, 7 or 8, respectively.

In addition to the above mentioned cyclodextrins, their derivatives may also be used. The preferred derivatives include, for example, methyl derivatives such as 2,6-dimethyl-$\beta$6-cyclodextrin, 2,3,6-trimethyl-,$\beta$-cyclodextrin or partially methylated $\beta$-cyclodextrin, and besides, maltosylcyclodextrin or glucosylcyclodextrin. These cyclodextrin derivatives are all water soluble, to greater or lesser degrees.

The cyclodextrin or its derivative is contained in the ink composition in an amount of 0.1–20% by weight based on the ink composition. When the content of the cyclodextrin or its derivative is less than 0.1% by weight, the resultant ink composition is not improved in terms of the stability of the emulsion or separating agent. When the content is more than 20% by weight, the resultant ink composition has an excessively high viscosity so that it writes poorly, but also it has an excessively large adhesion to a writing surface so that it is reduced in erasability. The content of the cyclodextrin or its derivative is preferably in the range of 0.5–10% by weight, more preferably in the range of 1–5% by weight.

The ink composition of the invention contains a resin which is film-forming at room temperatures so that when a writing is formed and the solvent has evaporated therefrom to form a dried writing on an impervious writing surface, the writing has a continuous resin layer which contains the colorant therein and which is separated from the writing surface by the layer of the separating agent on the writing surface, thereby making the writing readily separable from the writing surface or readily erasable thereon.

The film-forming resin may be either water insoluble or water soluble. A water insoluble resin may be incorporated into the ink composition in the form of an aqueous emulsion or a hydrosol. Alternatively, the water insoluble resin may be incorporated into the ink composition in the form of water-solubilzed resin by salt formation with a base. A water soluble resin is used as it is.

Preferred film-forming resin may be:
(1) an aqueous emulsion or a hydrosol of polyvinyl acetate, vinyl acetate copolymer, alkyd resin or polyurethane resin;
(2) a water-solublized vinyl acetate copolymer, alkyd resin or polyurethane resin;
(3) a water soluble resin; or
(4) any combination of the above.

The water-solubilized resin usually contains a carboxylic acid component or carboxylic groups which forms salts with inorganic or organic bases, such as alkali metals (e.g., sodium or potassium), ammonium bases or organic amines), thereby making the resin water soluble.

Preferred vinyl acetate copolymers include copolymers of vinyl acetate with comonomers such as vinyl esters other than vinyl acetate (e.g., vinyl propionate or versatie acid vinyl ester), unsaturated carboxylic acids (e.g., acrylic acid, methacrylic acid, maleic acid, maleic anhydride, fumaric acid, itaconic acid, crotonic acid or citraconic acid). These vinyl acetate copolymers are especially useful when being water-solubilized.

Other preferred vinyl acetate copolymers include copolymers of vinyl acetate with comonomers such as vinyl hydrocarbons (e.g., ethylene, propylene, styrene or $\alpha$-methylstyrene), or unsaturated carboxylic acids esters (e.g., methyl acrylate, ethyl methacrylate or dimethyl maleate). The vinyl acetate copolymer may be a graft one with the monomers as above described onto polyvinyl acetates.

More specifically, preferred vinyl acetate copolymers are exemplified by vinyl acetate-acrylic acid copolymer, vinyl acetate-methacrylic acid copolymer, vinyl acetate- styrene-acrylic acid copolymer, vinyl acetate-styrene-maleic anhydide copolymer, vinyl acetate-acrylic acid-methyl acrylate copolymer, vinyl acetate-methacrylic acid-methyl acrylate copolymer, vinyl acetate-acrylic acid-ethyl acrylate copolymer, vinyl acetate-methacrylic acid-methyl methacrylate copolymer or vinyl acetate-maleic anhydide copolymer.

Aqueous emulsion or hydrosol of polyvinyl acetate and vinyl acetate coplymers are readily commercially available. Water-solublized vinyl acetate copolymers are also commercially available.

Water-solublized alkyd resins may be prepared by condensation of excess unsaturated carboxylic acids with polyhydric alcohols, and salt formation with alkali metals, ammonium bases or organic amines. Water-solubilized polyurethane resins may be prepared by salt formation of pendant carboxylic groups in the polymer chain with alkali metals, ammonium bases or organic amines. These water-solubilized alkyd resins and urethane resins are also commercially available.

In turn, among the water soluble resins, synthetic resins such as polyvinyl alcohol resin, polyvinyl acetal resin or polyvinylpyrrolidone resin are preferred. Natural water soluble resins may also be used such as gum arabic or shellac. Polyvinyl alcohol resin is most preferred.

The ink composition of the invention contains the film-forming resin as above mentioned in a solid amount of 0.1–15% by weight, preferably in an amount of 0.3–10% by weight, based on the ink composition. When the amount of the resin is too large, the resultant ink composition has an excessively high viscosity so that it writes poorly and also writings formed therewith are not readily erased.

Among a variety of flm-forming resins as above mentioned, water soluble resins are preferred, in particular, polyvinyl alcohol resin, since it gives the resultant ink composition a greater stability through the formation of protective colloid in cooperation with the cyclodextrin. More specifically, the cyclodextrin stabilizes the various particles in the ink composition, in particular, particles of emulsion and pigment while the water soluble resin further stabilizes these particles on account of the formation of protective colloid.

The ink composition of the invention may contain a water soluble polyhydric alcohol to assist the separation of writings from the writing surface. The polyhydric alcohol usable includes, for example, ethylene glycol, diethylene glycol, triethylene glycol, propylene glycol, dipropylene glycol, tripropylene glycol, polyethylene glycol having a molecular weight of about 200–600, polypropylene glycol having a molecular weight of about 1000–3000, glycerine and trimethylolpropane. The polyhydric alcohol may be contained in an amount of not more than 20% by weight, preferably in an amount of not more than 10% by weight, based on the ink composition. When the amount of the polyhydric alcohol is too large, the resultant ink composition has an excessively large viscosity and writes poorly.

The ink composition of the invention may further contain a surfactant also to assist the separation of writings from the writing surface. The surfactant also serves to stabilize the various particles in the ink composition in cooperation with the cyclodextrin, and hence the ink composition. The surfactant may be either anionic, nonionic, cationic or ampholytic, or may be a fluorinated one, with anionic, nonionic, or fluorinated ones being preferred.

The anionic surfactant usable includes, for instance, sulfonated fatty acid ester such as dioctyl sodium sulfosuccinate, higher alcohol sulfate, polyoxyethylene alkyl phenyl ether sulfate, alkyl aryl sulfonate or olefin sulfonate. The nonionic surfactant usable includes, for instance, polyoxyethylene ether compound such as polyoxyethylene alkyl ether or polyoxyethylene alkyl phenyl ether, polyhydric alcohol fatty acid ester or polyhydric alcohol fatty acid ester polyoxyethylene ether. The ink composition may contain a surfactant in an amount of not more than 10% by weight, preferably in the range of 0.2–5% by weight, based on the ink composition. The use of excessive amounts deteriorates the erasability of the ink composition.

The ink composition may contain lower aliphatic alcohols so that writings are readily dried when formed. However, the alcohol must not break the emulsion in the ink composition, and therefore the amount may be not more than 15% by weight, preferably in the range of 1–10% by weight, based on the ink composition. The preferred alcohol may be ethanol, propanol or butanol.

The ink composition of the invention may further contain any additive that is used in the known water base erasable ink compositions, such as pH controllers, anticorrosion agents, antiseptics or antifungal agents in an effective amount.

When the ink composition of the invention is applied on an impervious writing surface and the solvent has evaporated therefrom, the separating agent forms a continuous oily layer on the writing surface, and the resin forms a film which contains the colorant on the layer of separating agent. Accordingly, the writing is readily separated from the writing surface.

The surfactant assists on one side the separation of the oily layer from the resin film when writing is formed, and on the other side, the surfactant provides a levelling effect with the writing formed and also prevents the oily layer from being unevenly distributed on the writing surface when a writing is formed, so that the dried writing is evenly erasable. Fluorinated surfactants are most remarkable in these effects.

According to the invention, it is preferred that the ink composition contains a water insoluble pigment as a colorant, a water soluble resin as a resin, and a surfactant, together with the cyclodextrin. It is further preferred that the ink composition is prepared in a specific manner as below mentioned so that the ink composition has a much improved storability.

The present inventors assume that in general when a cyclodextrin is added to a mixture of solid or liquid particles with a surfactant in water in which the surfactant adsorbs and surrounds the particles to stabilize them, the molecules of the cyclodextrin include the molecules of the surfactant, so that the cyclodextrin further stabilizes the particles which are already stabilized by the surfactant. In view of the above mechanism of stabilization of particles by the cyclodextrin, when an emulsion of oily material, a pigment and a surfactant are added to water (solvent) together with the cyclodextrin to prepare the ink composition of the invention, the particles of the emulsion are surrounded by the surfactant and the molecules of the surfactant are included by the molecules of the cyclodextrin. That is, the inclusion or adsorption of particles of emulsion by the cyclodextrin takes precedence over the inclusion or adsorption of particles of pigment by the cyclodextrin. As results, the cyclodextrin effectively stabilizes the particles of emulsion, but makes no contribution to the stabilization of the particles of pigment.

Accordingly, it will be necessary that not only the particles of the emulsion are stabilized by the cyclodextrin but also the particles of the pigment are stabilized by the surfactant and in addition by the cyclodextrin if an ink composition which contains particles of both emulsion of oily material and pigment should have a greater stability.

Therefore, according to the invention, it is preferred that the ink composition is prepared by adding a surfactant and a colorant to water; and then adding the cyclodextrin or its derivative to the mixture; and then adding the separating agent in the form of emulsion of oily material to the mixture; and then finally adding the water soluble resin to the mixture.

According to the above process, the surfactant adsorbs the particles of the pigment in water, and then the added cyclodextrin includes or adsorbs the particles of the pigment thereby first stabilizing the pigment. Then, the emulsion is added to the aqueous mixture so that emulsion is stabilized by the residual cyclodextrin. Finally, the water soluble resin is added to the aqueous mixture so that the individual particles of both emulsion and the pigment are prevented from coming close to each other to form aggregates on account of the formation of protective colloid of the water soluble resin. In this way, there is prepared an ink composition which is remarkably improved in storability over a long period.

As set forth above, the erasable ink composition of the invention comprises water as a solvent, a resin which is film-forming at room temperature, an aqueous emulsion of nonvolatile oily material which is liquid at room temperatures as a separating agent, and in addition, the cyclodextrin as a stabilizer especially for the emulsion. When a writing is formed therewith on an impervious writing surface and the solvent has evaporated, the separating agent forms a continuous oily layer on the writing surface to separate the resin layer which contains the pigment therein from the writing surface. As a result, the writing is readily separated from the writing surface or erased with an eraser composed of felt, for example, at the erased portion only. Moreover, the emulsion in the ink composition is stabilized by the cyclodextrin possibly by the inclusion of the particles of emulsion in the molecules of the cyclodextrin so that the ink composition of the invention has improved storability and even after long standing it forms a writing which is readily erasable.

Examples of the ink composition of the invention will now be described, however, the invention is not limited thereto. In the examples, the amounts are represented in terms of % by weight, with the balance being water. The ink compositions contain an antiseptic and antifungal in an effective amount.

| Example 1 | |
|---|---|
| Colorant: Phthalocyanin green | 2 |
| Dispersant: Ammonium salt of styrene-butyl acrylate-methacrylic acid copolymer | 2 |
| Resin: | |
| Water soluble polyvinyl acetal resin | 2 |
| Vinyl acetate-ethyl acrylate-acrylic acid copolymer (hydrosol) | 1 |
| Separating agent: Isopropyl myristate | 8 |
| Cyclodextrin: α-Cyclodextrin | 1.6 |
| Surfactant: Anionic | 0.5 |
| Example 2 | |
| Colorant: Carbon black | 5 |
| Dispersant: Acrylic resin | 3 |
| Resin: | |
| Water soluble polyvinyl acetal resin | 1 |
| Polyurethane resin (emulsion) | 5 |
| Separating agent: | |
| Butyl stearate | 5 |
| Dioctyl dodecanedioate | 5 |
| Cyclodextrin: β-Cyclodextrin | 1 |
| Surfactant: Anionic | 1 |
| Example 3 | |
| Colorant: Carbon black | 3 |
| Dispersant: Vinyl acetate-acrylic acid copolymer | 3 |

-continued

| Resin: | |
|---|---|
| Water soluble polyvinyl alcohol resin | 5 |
| Polyurethane resin (emulsion) | 5 |
| Separating agent: | |
| Butyl laurate | 4 |
| Squalane | 1 |
| Cyclodextrin: Partially methylated β-Cyclodextrin | 10 |
| Surfactant: Ampholytic | 1.5 |
| Example 4 | |
| Colorant: Monoazo Red | 4 |
| Dispersant: Polyvinyl acetal resin | 2 |
| Resin: | |
| Water soluble polyvinyl alcohol resin | 4 |
| Acrylic resin | 2 |
| Separating agent: | |
| Butyl palmitate | 12 |
| Lauryl alcohol | 3 |
| Cyclodextrin: Maltosylcyclodextrin | 5 |
| Surfactant: Nonionic | 0.5 |

The following ink compositions of Reference Examples 1 to 3 were prepared corresponding to the ink compositions of Examples 1 to 3 except that the former ink compositions contained no cyclodextrins. The ink composition of Reference Example 4 was the same as that of Example 4 except that the latter contained dextrin in place of cyclodextrins.

| Reference Example 1 | |
|---|---|
| Colorant: Phthalocyanin green | 2 |
| Dispersant: Ammonium salt of styrene-butyl acrylate-methacrylic acid copolymer | 2 |
| Resin: | |
| Water soluble polyvinyl acetal resin | 2 |
| Vinyl acetate-ethyl acrylate-acrylic acid copolymer (hydrosol) | 1 |
| Separating agent: Isopropyl myristate | 8 |
| Surfactant: Anionic | 0.5 |
| Reference Example 2 | |
| Colorant: Carbon black | 5 |
| Dispersant: Acrylic resin | 3 |
| Resin: | |
| Water soluble polyvinyl acetal resin | 1 |
| Polyurethane resin (emulsion) | 5 |
| Separating agent: | |
| Butyl stearate | 5 |
| Dioctyl dodecanedioate | 5 |
| Surfactant: Anionic | 1 |
| Reference Example 3 | |
| Colorant: Carbon black | 3 |
| Dispersant: Vinyl acetate-acrylic acid copolymer | 3 |
| Resin: | |
| Water soluble polyvinyl alcohol resin | 5 |
| Polyurethane resin (emulsion) | 5 |
| Separating agent: | |
| Butyl laurate | 4 |
| Squalane | 1 |
| Surfactant: Ampholytic | 1.5 |
| Reference Example 4 | |
| Colorant: Monoazo Red | 4 |
| Dispersant: Polyvinyl acetal resin | 2 |

-continued

| Resin: | |
|---|---|
| Water soluble polyvinyl alcohol resin | 4 |
| Acrylic resin | 2 |
| Separating agent: | |
| Butyl palmitate | 12 |
| Lauryl alcohol | 3 |
| Additive: Dextrin | 2 |
| Surfactant: Nonionic | 0.5 |

The storability of the ink composition was evaluated as follows. After the ink composition was left standing in a thermostat at 50° C. for 7 days or 14 days, it was examined visually. When the ink composition was even, the storability was marked "A"; when partial separation of oily material was found at the surface, the storability was marked "B"; and when the oily phase was found to separate completely from the aqueous phase, the storability was marked "C".

The erasability of writing was evaluated as follows. A writing was formed on a white board of evaluated as follows temperature of 20° C and a relative humidity of 65% and then left standing for 5 minutes. The writing was then wiped with an eraser made of felt under a load of 50 g. When the writing was erased completely, the erasability was marked "A"; when the writing was erased more than half, the erasability was marked "B"; and when the writing was not erased at all, the erasability was marked "C". The results are indicated in Table 1.

Ink compositions of the following components were prepared in a manner as mentioned below.

| | |
|---|---|
| Colorant: Monoazo Red | 3 |
| Dispersant: Ammonium salt of styrene-maleic acid copolymer | 2 |
| Resin: Water soluble polyvinyl acetal resin | 5 |
| Separating agent: 2-Ethylhexanoic acid triglyceride | 10 |
| Cyclodextrin: | |
| α-Cyclodextrin | 2.4 |
| β-Cyclodextrin | 1.2 |
| γ-Cyclodextrin | 0.4 |
| Surfactant: | |
| Anionic | 1 |
| Nonionic | 0.5 |

Example 5

The surfactant and the pigment were added to water (solvent) and the mixture was stirred for two hours. The cyclodextrins were then added to the mixture and it was stirred for two hours. Then, the separating agent in the form of an emulsion was added to the mixture and it was stirred for two hours. Finally, the water soluble resin was added to the mixture and it was stirred for two hours, to provide the ink composition.

Reference Example 5

The surfactant and the pigment were added to water and the mixture was stirred for two hours. The resin was then added to the mixture and it was stirred for two hours. Then, the separating agent was added to the mixture and it was stirred for two hours. Finally, the cyclodextrins were added to the mixture and it was stirred for two hours, to provide the ink composition.

Reference Example 6

The surfactant and the resin were added to water and the mixture was stirred for two hours. The pigment was then added to the mixture and it was stirred for two hours. Then, the cyclodextrins were added to the mixture and it was stirred for two hours. Finally, the separating agent was added to the mixture and it was stirred for two hours, to provide the ink composition.

Reference Example 7

The separating agent and the cyclodextrins were mixed together and stirred for two hours. The surfactant and the pigment were added to the mixture together with water, and the resultant mixture was stirred for two hours. Finally, the resin was added to the mixture and it was stirred for two hours, to provide the ink composition.

The storability of the ink compositions of Example 5 and Reference Examples 5–7 was evaluated in the same manner as hereinbefore after the ink composition was left standing in a thermostat at 50° C. for 14 days. The results are shown in Table 1.

TABLE 1

| | Storability at 50° C. after | | |
|---|---|---|---|
| | 7 days | 14 days | Erasability |
| Example | | | |
| 1 | A | A | A |
| 2 | A | B | A |
| 3 | A | A | A |
| 4 | A | A | A |
| Reference | | | |
| 1 | C | C | A |
| 2 | C | C | A |
| 3 | C | C | A |
| 4 | C | C | A |
| Example 5 | — | A | — |
| Reference | | | |
| 5 | — | C | — |
| 6 | — | C | — |
| 7 | — | C | — |

What is claimed is:

1. A water base erasable ink composition for use in marking pens which comprises:

(a) water as a solvent;

(b) a coloring agent;

(c) an aqueous emulsion of at least one oily material which is liquid and nonvolatile at room temperature and is selected from the group consisting of aliphatic carboxylic acid esters, higher hydrocarbons selected from the group consisting of liquid paraffin, squalane and oxidized polyethylene wax, and aliphatic alcohols having 6 to 12 carbon atoms in a dry amount of 1–50% by weight based on the ink composition;

(d) a cyclodextrin or a modified cyclodextrin in an amount of 0.1–20% by weight based on the ink composition; and (e) a resin which is film-forming at room temperatures.

2. A water base erasable ink composition according to claim 1 wherein the cyclodextrin is selected from the group consisting of α-, β- and γ-cyclodextrin and the modified cyclodextrin is selected from the group consisting of 2,6-dimethyl-β-cyclodextrin, 2,3,6-trimethyl-β-cyclodextrin, partially methylated β-cyclodextrin, maltosylcyclodextrin and glucosylcyclodextrin.

3. A water base erasable ink composition according to claim 1 wherein the coloring agent is a water insoluble pigment.

4. A water base erasable ink composition according to claim 3 wherein the water insoluble pigment is contained in an amount of 0.1–30% by weight based on the ink composition.

5. A water base erasable ink composition according to claim 1 wherein the resin is a water soluble resin, or the resin is incorporated in the form of:
(i) an aqueous emulsion or a hydrosol of polyvinyl acetate, vinyl acetate copolymer, alkyd resin or polyurethane resin; or
(ii) a water-solubilized vinyl acetate copolymer, alkyd resin or polyurethane resin.

6. A water base erasable ink composition according to claim 1 which comprises:
(a) water as a solvent;
(b) a water insoluble pigment;
(c) an aqueous emulsion of at least one oily material which is liquid and nonvolatile at room temperatures and is selected from the group consisting of aliphatic carboxylic acid esters, higher hydrocarbons selected from the group consisting of liquid paraffin, squalane and oxidized polyethylene wax, and aliphatic alcohols having 6 to 12 carbon atoms in a dry amount of 1–50% by weight based on the ink composition;
(d) a cyclodextrin or a modified cyclodextrin in an amount of 0.1–20% by weight based on the ink composition;
(e) a water soluble resin which is film-forming at room temperatures; and
(f) a surfactant.

7. A water base erasable ink composition according to claim 6 wherein the cyclodextrin is selected from the group consisting of α-, β- and γ-cyclodextrin and the modified cyclodextrin is selected from the group consisting of 2,6-dimethyl-β-cyclodextrin, 2,3,6-trimethyl-β-cyclodextrin, partially methylated β-cyclodextrin, maltosylcyclodextrin and glucosylcyclodextrin.

8. A process for the preparation of a water base erasable ink composition for use in marking pens which comprises:
(a) water as a solvent;
(b) a water insoluble pigment;
(c) an aqueous emulsion of at least one oily material which is liquid and nonvolatile at room temperatures and is selected from the group consisting of aliphatic carboxylic acid esters, higher hydrocarbons selected from the group, consisting of paraffin wax, squalane and oxidized polyethylene wax, and aliphatic alcohols having 6 to 12 carbon atoms in a dry amount of 1–50% by weight based on the ink composition;
(d) a cyclodextrin or a modified cyclodextrin in an amount of 0.5–10% by weight based on the ink composition;
(e) a water soluble resin which is film-forming at room temperatures; and
(f) a surfactant;
the process comprising: adding the surfactant and the pigment to water, and then adding the cyclodextrin or the modified cyclodextrin to the water to form a mixture, and then adding the emulsion of the oily material to the mixture; and then finally adding the water soluble resin to the mixture.

9. A process according to claim 8 wherein the cyclodextrin is selected from the group consisting of α-, β- and τ-cyclodextrin and the modified cyclodextrin is selected from the group consisting of 2,6-dimethyl-βcyclodextrin, 2,3,6-trimethyl-β-cyclodextrin, partially methylated β-cyclodextrin, maltosylcyclodextrin and glucosylcyclodextrin.

* * * * *